(No Model.) 2 Sheets—Sheet 1.

H. C. PRICE.
PHOTOGRAPHIC CAMERA.

No. 358,942. Patented Mar. 8, 1887.

Witnesses
Jas. R. Bowen.
Richard J. Cody.

Inventor
H. C. Price
by his atty's
Gifford Bryson (No Model.) 2 Sheets—Sheet 2.

H. C. PRICE.
PHOTOGRAPHIC CAMERA.

No. 358,942. Patented Mar. 8, 1887.

UNITED STATES PATENT OFFICE.

HENRY C. PRICE, OF NEW YORK, N. Y., ASSIGNOR TO THE SCOVILL MANUFACTURING COMPANY, OF SAME PLACE.

PHOTOGRAPHIC CAMERA.

SPECIFICATION forming part of Letters Patent No. 358,942, dated March 8, 1887.

Application filed December 24, 1885. Serial No. 186,626. (No model.)

*To all whom it may concern:*

Be it known that I, HENRY C. PRICE, of New York, in the county of New York and State of New York, have invented a certain new and useful Improvement in Photographic Cameras, of which the following is a specification.

This improvement relates to the kind of photographic cameras which are known as "detective-cameras," which have a box or case arranged outside the camera proper, in order that the camera shall not be easily distinguishable as a camera.

The object of my improvement is to reduce the necessity for opening the outer box or case of such a camera in using it.

My improvement consists in the combination, with a camera having rollers on which sensitized paper is wound and a movable back by which the rollers are supported, of an outer box or case containing the camera, and provided with one slot through which protrudes a journal of the roller onto which the sensitized paper, after exposure, is to be wound, and another slot through which passes from the movable camera-back an extension whereby it can be adjusted from outside the box or case, and covers below the bottom of the box or case to prevent light from entering through the said slots. The other roller, from which the sensitized paper is unwound, may have one of the journals extended through a slot in the bottom of the box or case, combined with an indicator to show how much of the paper is wound off it.

Figure 2:
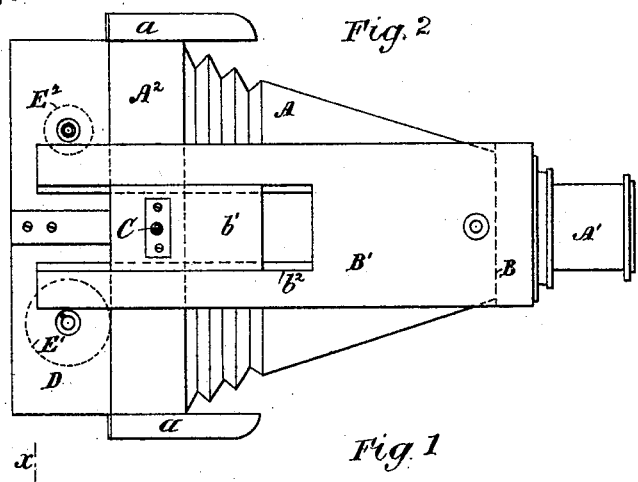
Figure 1:
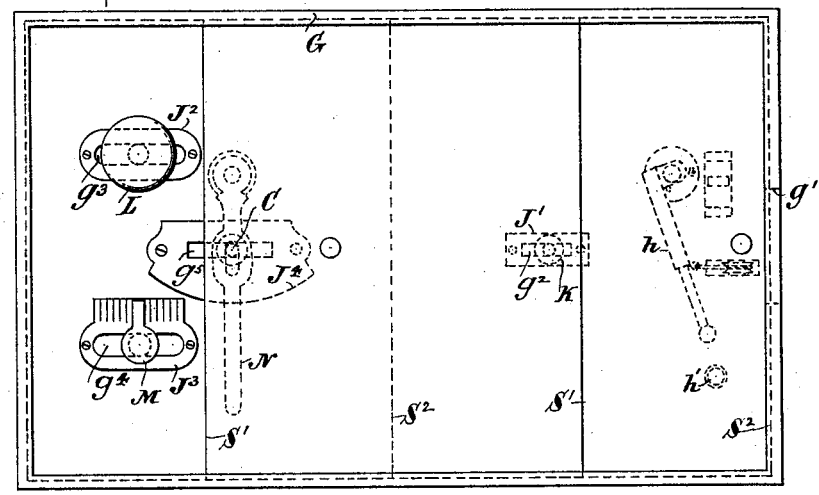
Figure 3:
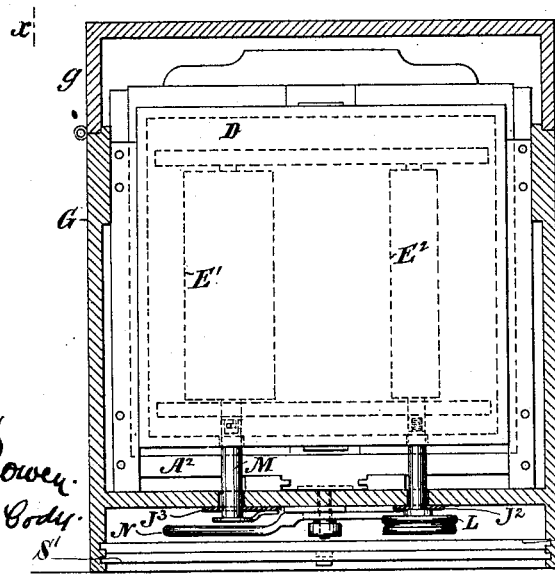
Figure 4:
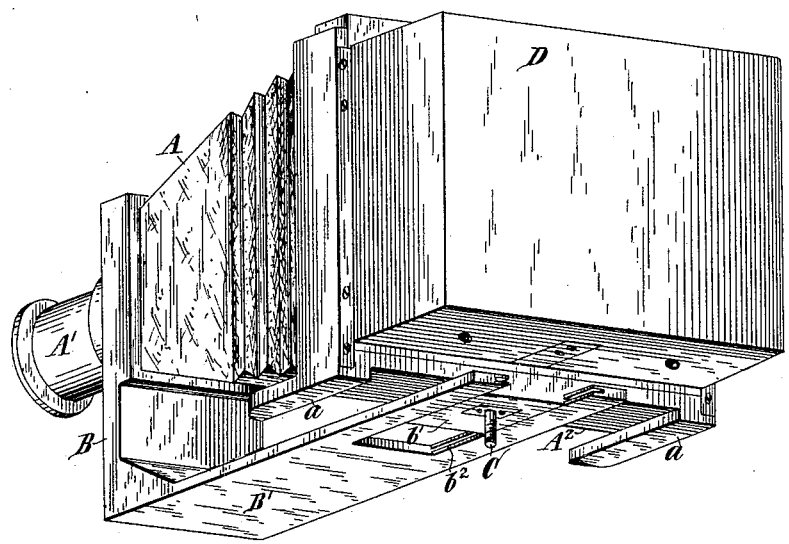

In the accompanying drawings, Figure 1 is an inverted plan or bottom view of a detective-camera embodying my improvement. Fig. 2 is an inverted plan or bottom view of the camera proper removed from the box or case. Fig. 3 is a transverse section of the complete camera, taken at the plane of the dotted line $x\,x$, Fig. 1. Fig. 4 is a perspective view of the camera.

Similar letters of reference designate corresponding parts in all the figures.

A A' A² designate the camera proper, A being the body, A' being the lens-tube at the forward end of the body, and A² being a movable back.

The body A is supported in a bracket, B, erected on a frame, B'. The movable back A² is provided with supporting-feet $a$ and a tongue-piece, $b'$, which fits in a slot, $b^2$, in the frame B'. The movable back A² can therefore slide lengthwise of the frame B'. It is provided with a screw, C, which forms a downward extension of it.

D designates a holder for sensitized paper. The paper is attached to rollers E' E². It is first wound mainly on the roller E', and as it is used it is wound from the latter onto the roller E².

G designates a box or case provided with a hinged cover, $g$, and furnished at the front with an opening, $g'$.

The shutter mechanism is operated by a lever, $h$, arranged below the box or case to set the shutter, and the shutter is released by means of a push-piece, $h'$.

The frame B' and the feet $a$ of the movable back A² of the camera rest on the bottom of the box or case G and can move along the same in the direction of its length.

The bottom of the box or case G has longitudinal slots $g^2\,g^3\,g^4\,g^5$ in it. Face plates or escutcheons of metal J' J² J³ J⁴ are fastened in place on the bottom of the box or case adjacent to these slots. A screw, K, extends through the slot $g^2$ and enters the frame B', thereby securing the latter in place after its adjustment. A screw, L, is passed through the slot $g^3$ and fastened in one of the journals of the roller E². It, in effect, forms part of the journal in which it is secured. The handle of this screw may be manipulated to rotate the roller E² for the purpose of winding the sensitized paper on it. A rod, M, extends through the slot $g^4$ and is fastened, preferably by a bayonet-joint, to one of the journals of the roller E'. It is, in effect, part of this journal. A pointer is affixed to its end, and this, in connection with marks on the face-plate J³, indicates the degree to which the roller E' rotates at any given time, and hence enables the photographer, without opening the box or case, to shift the sensitized paper properly for a new exposure. The screw C projects through the slot $g^5$ and extends through the slot of a lever, N, arranged transversely to the box or case and pivoted or fulcrumed to the bottom. A nut applied to the end of the screw provides for clamping the lever N in position to secure the camera-back when adjusted. The lever, when released from the nut, serves for adjusting the camera-back.

The sides and ends of the box or case G extend considerably below the bottom, so that the parts arranged below the bottom will not come in contact with a support on which the box or case may be placed.

$S'$ $S^2$ designate covers arranged below the bottom of the box or case and close to the lower edge of the sides and ends. They are shown as working in slideways provided in the sides and ends, close to the lower edges. One is arranged lower than the other, so that either can slide without affecting the other. These covers protect the parts which are located below the bottom of the box or case. They also exclude light from the box or case, preventing it from passing through the slots in the bottom of the box or case. Owing to this the shutter that is ordinarily used adjacent to the sensitized paper may be dispensed with; hence I obviate opening the box or case, which is necessary for operating such shutter when it is employed. Thus I render a detective-camera more desirable, because, owing to obviating much necessity for opening it, I lessen the liability for the discovery that it is a camera.

The covers $S'$ $S^2$ may be hinged instead of sliding, if desirable. They will have to be moved in order to reach the parts which are located between them and the bottom of the box or case.

What I claim as my invention, and desire to secure by Letters Patent, is—

The combination, with a camera having rollers on which sensitized paper is wound, and a movable back by which the rollers are supported, of an outer box or case wholly containing the camera, and provided with one slot through which protrudes a journal of the roller onto which the sensitized paper, after exposure, is to be wound, and another slot through which passes from the movable camera back an extension whereby it can be adjusted from outside the box or case, and covers below the bottom of the box or case, substantially as specified.

HENRY C. PRICE.

Witnesses:
DANIEL H. DRISCOLL,
JAS. R. BOWEN.